United States Patent [19]

Mizobe

[11] 4,418,764

[45] Dec. 6, 1983

[54] FLUID IMPULSE TORQUE TOOL

[75] Inventor: Masatoshi Mizobe, Nara, Japan

[73] Assignee: Giken Kogyo Kabushiki Kaisha, Osaka, Japan

[21] Appl. No.: 283,152

[22] Filed: Jul. 14, 1981

[51] Int. Cl.$^3$ .............................................. B23Q 5/06
[52] U.S. Cl. ..................................... 173/12; 192/150; 81/470
[58] Field of Search .......................... 173/12, 93, 93.5; 81/467, 470; 137/462; 192/0.034, 56 F, 150

[56] References Cited

U.S. PATENT DOCUMENTS

| 3,116,617 | 1/1964 | Skoog | 173/93 X |
| 3,174,606 | 3/1965 | Hornschuch et al. | 173/93 X |
| 3,368,631 | 2/1968 | MacNaughton | 173/12 |
| 4,113,080 | 9/1978 | Thackston et al. | 192/150 |

FOREIGN PATENT DOCUMENTS 567517  5/1957  Belgium ............................ 173/93

Primary Examiner—Frederick R. Schmidt
Assistant Examiner—Robert P. Olszewski
Attorney, Agent, or Firm—Browdy and Neimark

[57] ABSTRACT

A fluid impulse torque tool used for tightening screws, which automatically stops when a predetermined tightening force is attained. A piston is actuated by relief oil from a relief valve attached to an oil pressure pulse generator. A shut-off valve placed in an air feed passageway to an air motor is connected to the piston. In a screw tightening operation, when a predetermined tightening force is attained, relief oil is produced to move the piston and this movement is transmitted to the valve to close the latter, thus shutting the air feed passageway to the air motor, so that the latter is stopped.

7 Claims, 9 Drawing Figures

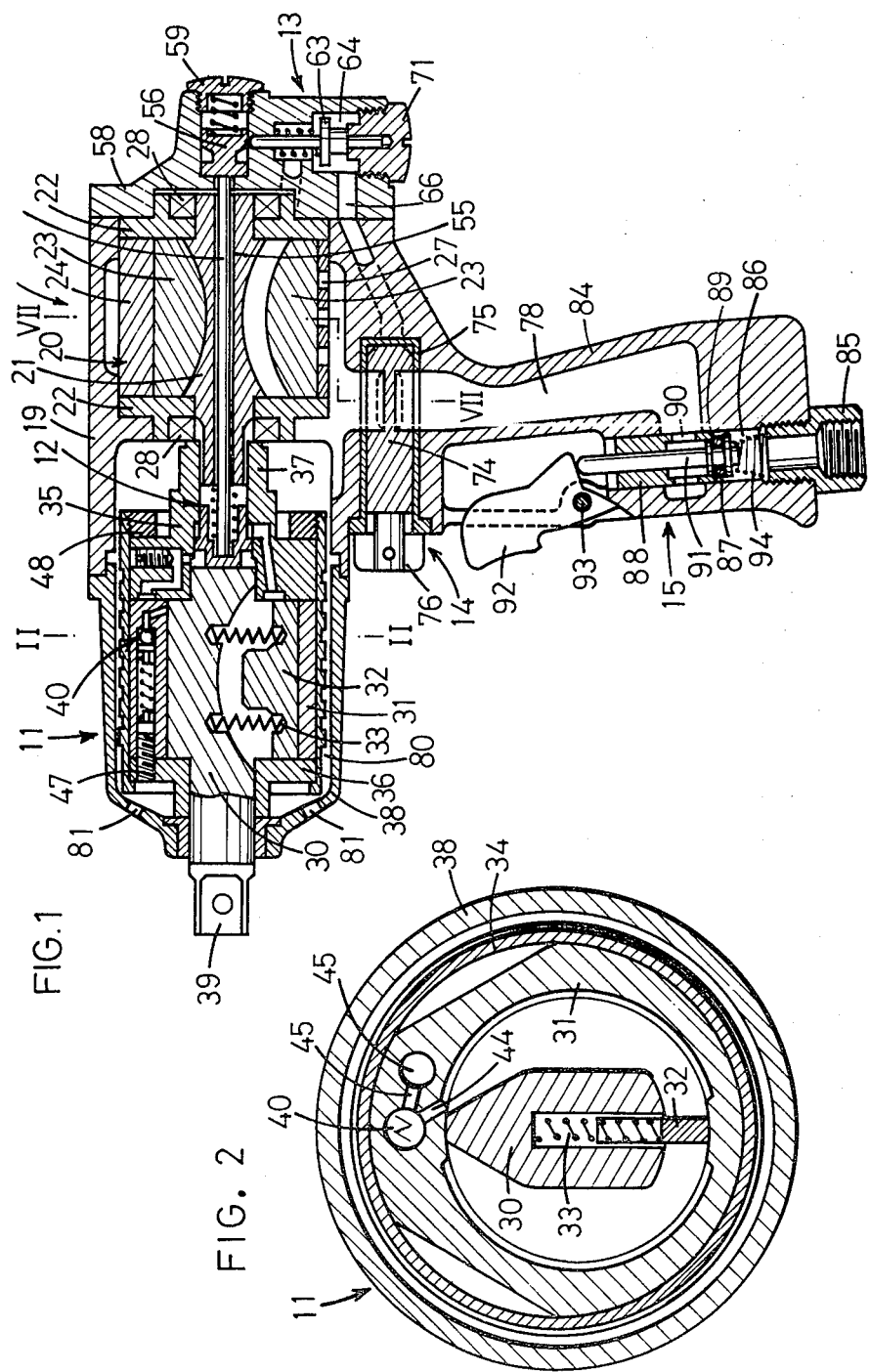

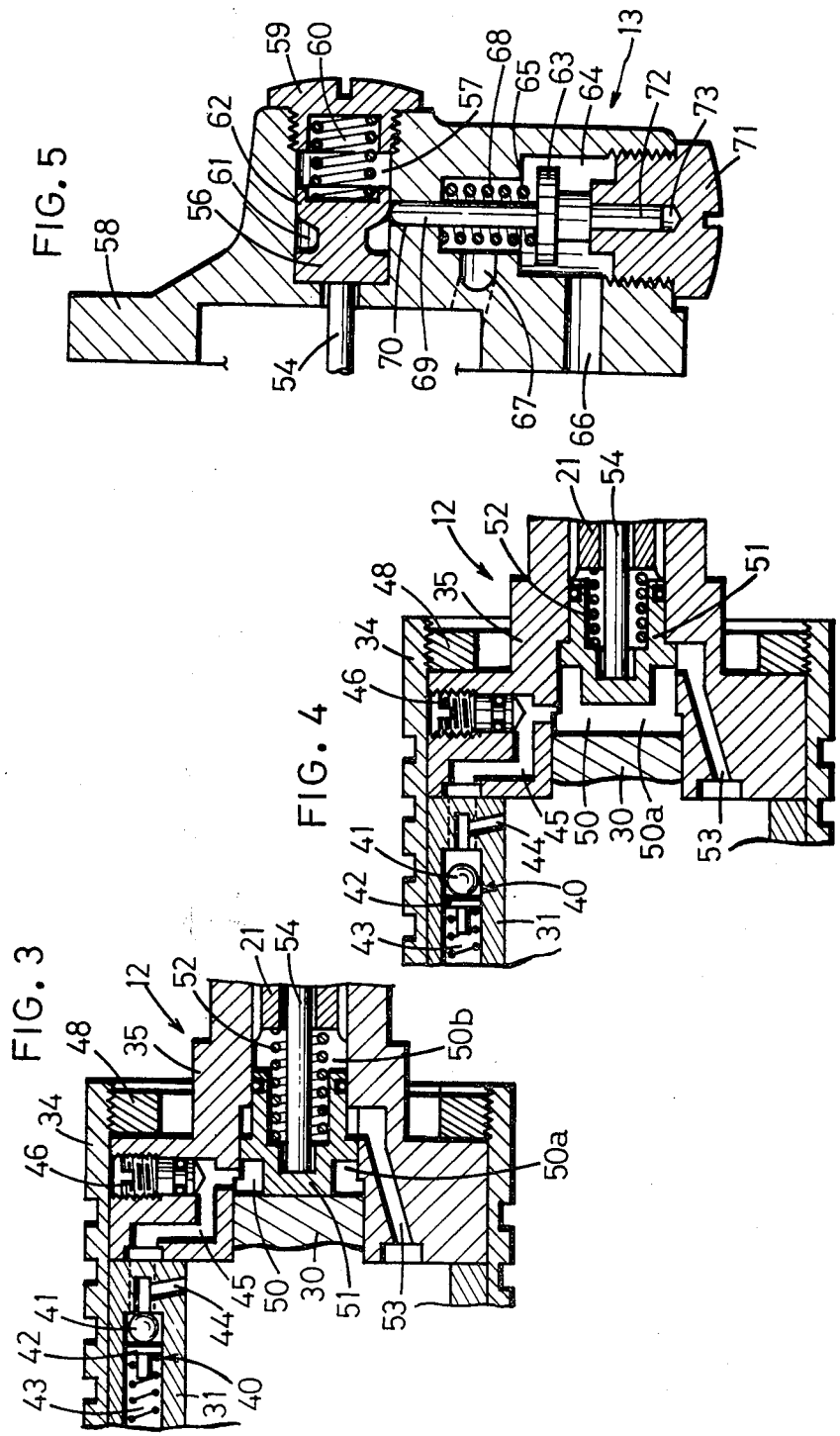

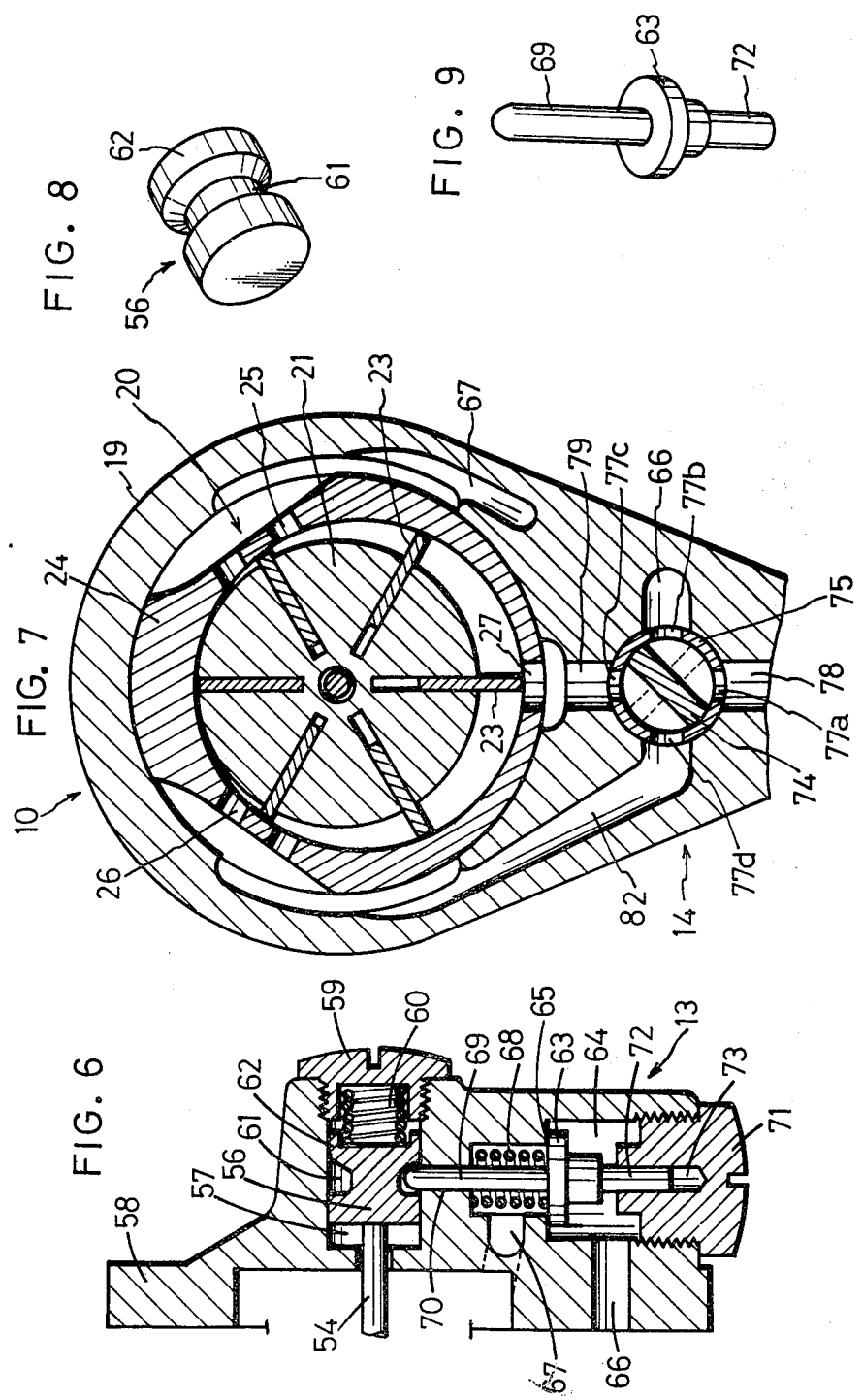

FLUID IMPULSE TORQUE TOOL

BACKGROUND OF THE INVENTION

This invention relates to a fluid impulse torque tool used in a screw tightening operation and more particularly it relates to a torque tool wherein an air motor is rotated to cause an oil pressure generator to produce a pulse pressure, which is used to tighten screws.

A torque tool using an oil pressure generator has already been proposed (U.S. Pat. No. 3,116,617). This torque tool is adapted to produce an impulse torque by hydraulic means instead of by conventional mechanical means and is characterized by little noise and vibration, as compared with torque tools using mechanical means for producing impulse torques. This hydraulic torque tool has a relief valve attached to an oil pressure pulse generator and is arranged so that when a predetermined tightening force is attained, the relief valve is actuated to allow the working oil in the oil pressure pulse generator to escape as relief oil, thus preventing generation of a pulse pressure above a fixed value. However, the conventional tool has only the function of preventing generation of a pulse pressure above a fixed value but has no function of automatically stopping the rotation of the air motor. As a result, even after the screw tightening operation has been completed, the air motor continues rotating and the pulse generator continues its pulse generating function. This is utterly useless and uneconomical, detracting from the durability of the air motor and oil pressure pulse generator. Further, with this torque tool, it is impossible to detect the completion of screw tightening, which is inconvenient to actual operation.

SUMMARY OF THE INVENTION

An object of the invention is to provide a torque tool arranged so that the rotation of the air motor is automatically stopped when a predetermined torque is attained.

Another object of the invention is to provide a torque tool adapted to provide for more reliable automatic stoppage of the air motor by making use of relief oil from a relief valve attached to the oil pressure generator.

A further object of the invention is to provide a torque tool wherein relief oil is used to actuate a piston, the actuation of the latter being transmitted to a shut-off valve installed in an air feed passageway to an air motor so that the shut-off valve is closed as the piston is actuated, thereby cutting off the supply of air to the air motor.

Another object of the invention is to provide a torque tool which is simple in construction and can be produced at low cost.

Other objects and features of the invention will become more apparent from the following description when taken in conjunction with the accompanying drawings. It is to be understood that the embodiment shown in the drawings is only for descriptive purposes, not limiting the scope of the invention.

BRIEF DESCRIPTION OF THE DRAWINGS

FIG. 1 is a longitudinal section of a preferred embodiment of the torque tool of the present invention;

FIG. 2 is an enlarged section taken along the line II—II of FIG. 1;

FIG. 3 is an enlarged section of a portion of the piston of FIG. 1 in a state where the piston is not moved by relief oil;

FIG. 4 is a section of the same portion as that shown in FIG. 3, illustrating a state where the piston is moved by relief oil;

FIG. 5 is an enlarged section of a portion of the shut-off valve of FIG. 1 in an opened state;

FIG. 6 is a section of the same portion as that shown in FIG. 5, illustrating the shut-off valve in a closed state;

FIG. 7 is an enlarged section taken along the line VII—VII of FIG. 1;

FIG. 8 is a perspective view of an actuating member; and

FIG. 9 is a perspective view of the body of an automatic shut-off valve.

DETAILED DESCRIPTION OF THE PREFERRED EMBODIMENT

The invention will now be described with reference to the accompanying drawings. FIG. 1 is a sectional view of an embodiment of the torque tool of the invention. Broadly speaking, this torque tool comprises an air motor section 10, an oil pressure pulse generating section 11, a piston section 12, an automatic shut-off valve section 13, a reversing valve section 14, and an ON-OFF operating valve section 15. The automatic shut-off valve section 13 is disposed in an air feed passageway through which high pressure air is fed to the air motor section 10. The torque produced in the air motor section 10 is transmitted to the oil pressure pulse generating section 11, where a pulse pressure for screw tightening is produced. The piston section 12 is actuated by relief oil from the oil pressure pulse generating section 11. The actuation of the piston section 12 is transmitted to the automatic shut-off valve section 13 through suitable connecting means. The ON-OFF operating valve section 15 is manually opened and closed by the operator.

The construction and functioning of the air motor section 10 are as follows:

An air motor 20 is housed in a casing 19 and is rotated at high speed when fed with high pressure air. Since the air motor 20 is of substantially the same construction as those commonly used, it will be described only briefly herein. A rotor 21 is supported at both ends thereof for rotation in cylinder covers 22. The rotor 21 has vanes 23 radially movably received therein. A cylinder 24 is disposed radially outwardly of the rotor 21 and the vanes 23 are rotated with their front ends kept in contact with the inner wall surface of said cylinder 24 at all times. The inner wall surface of the cylinder 24 is circular, as viewed in cross-section, but the center line at the origin of the inner radius of the cylinder 24 is deviated from the center line of the rotor 21. Thus, when the rotor 21 is rotated within the cylinder 24, the vanes 23 are rotated with their front ends centrifugally pressed against the inner wall surface of the cylinder 24 at all times while the vanes 23 are radially outwardly and inwardly moved as they are rotated. The wall of the cylinder 24 is formed with air passage holes 25, 26 and 27 at three places. For forward rotation of the air motor 20, the holes 25 serve as air feed holes and the holes 26 and 27 as exhaust holes. More particularly, high pressure air fed in through the holes 25 acts on the vanes 23 to rotate the rotor 21. The numeral 28 denotes bearings for supporting the rotor 21.

The construction and functioning of the oil pressure pulse generating section 11 are as follows:

The section 11 is known in the art and may be of substantially the same as that disclosed in U.S. Pat. No. 3,116,617. Therefore, it will be described only briefly herein. A main shaft 30 is installed in a liner 31. The clearance between the main shaft 30 and the liner 31 is filled with oil. The main shaft 30 has a driving blade 32 radially movably received therein. The driving blade 32 is radially outwardly urged by springs 33, so that its front end is in contact with the inner wall surface of the liner 31. The numeral 34 denotes a liner case and 35, 36 denote liner case lids. The end 37 of one liner case lid 35 is spline-wise connected to the rotor 21 of the air motor, so that when the rotor 21 is rotated, the liner case lid 35 is rotated, thus rotating the liner 31, liner case 34 and the other liner case lid 36. When the liner 31 is rotated, the main shaft 30, which is disposed within the liner 31, contacts its wall surface with the inner wall surface of the liner 31 at certain rotative positions, and concurrently therewith an oil pressure difference is temporarily produced across the driving plate 32 within the liner 31, resulting in a pulse pressure which acts on the main shaft 30 and produces a torque in the latter. The numeral 38 denotes a cover, through which the end 39 of the main shaft 30 extends to receive a suitable attachment thereon for connection to a bolt head or the like.

The liner 31 has a relief valve 40 installed therein. When a predetermined amount of oil pressure is reached to raise the oil pressure in the liner 31 above a fixed value, the relief valve 40 is opened to release part of the oil in the liner 31, preventing generation of a pulse pressure above a fixed value. The ball 41 of the relief valve 40 is subjected to a pressing force produced by a spring 43 through a ball seat 42, so that normally the ball 41 closes an oil passageway 44 leading to the interior of the liner 31. However, when the pressure in the liner 31 rises above the the fixed value, the oil pressure moves the ball 41 against the pressing force of the spring 43, as shown in FIG. 4, with part of the oil in the liner 31 flowing through the oil passageway 44 into another oil passageway 45, which leads to an oil chamber 50, so that the oil flowing into the oil passageway 45 flows into the oil chamber 50. A needle valve 46 is placed in the oil passageway 45 to control the flow rate of oil through the oil passageway. The numeral 47 denotes a bolt for supporting the spring 43 and the spring pressure on the ball 41 can be adjusted by said bolt 47. A nut 48 bears against the rear surface of the liner case lid 35 to prevent the liner 31 and liner case lids 35 and 36 from slipping off the liner case 34.

The piston section 12 will now be described. The oil chamber 50 is centrally formed in the liner case lid 35. A piston 51 is housed in the oil chamber 50 and is movable in the oil chamber 50. Thus, the oil chamber 50 serves as a cylinder for the piston 51. The oil passageway 45 opens into the rear chamber 50a of the oil chamber 50, so that when relief oil flows through the oil passageway 45 into the rear chamber 50a, the piston 51 is pushed by the relief oil to move forward (to the right as viewed in FIG. 1). A spring 52 is installed in the front chamber 50b of the oil chamber 50 to urge the piston 51 in the direction of retraction to the left as viewed in FIG. 1 at all times. Therefore, when high pressure relief oil flows into the piston rear chamber 50a, the piston 51 advances against the force of the spring 52, but when the relief oil flow comes to an end, the piston 51 returns to the original position under the restoring force of the springs 52. In addition, there is a very small clearance between the piston 51 and the inner wall surface of the oil chamber 50, so that as the piston 51 is retracted, the oil in the piston rear chamber 50a slowly moves through this clearance, flowing into an oil passageway 53 opening into the oil chamber 50. Since the oil passageway 53 leads to the interior of the liner 31, the oil flowing into the oil passageway 53 returns to the interior of the liner 31.

The movement of the piston 51 is transmitted to the automatic shut-off valve section 13 by a rod 54, which extends through a throughgoing hole 55 centrally formed in the rotor 21 of the air motor. The rear end of the rod 54 is in contact with a shut-off valve actuating member 56, which is slidably received in a cylindrical hole 57 formed in a casing rear cover 58. The open end of the cylindrical hole 57 is closed by a threaded lid 59. A spring 60 is interposed between the actuating member 56 and the threaded lid 59, urging the actuating member 56 to the left at all times. As shown in FIG. 8, the lateral wall of the actuating member 56 is formed with an annular groove 61. The numeral 62 denotes other wall surface than that of the groove 62.

The automatic shut-off valve section 13 will now be described. A valve body 63 is received in a valve chamber 64 formed in the casing rear cover 58. The valve body 63 contacting a valve seat 65 closes the valve and separating from said valve seat opens the valve. Of two air passageways opening into the valve chamber 64, one shown at 66 communicates with the reversing valve section 14 and the other air passageway 67 communicates with the air passage holes 25 in the air motor 20. Thus, when it is desired to rotate the air motor 20 in the forward direction, high pressure air flowing into the valve chamber 64 through the air passageway 66 is admitted into the clearance between the valve body 63 and the valve seat 65 and then into the air passageway 67 to reach the air passage holes 25, driving the air motor 20 in the forward direction. During the opening of the valve, the high pressure air passes through the space between the valve body 63 and the valve seat 65, during which time the air pressure acts on the valve body 63, which is thereby subjected to a force which urges it into contact with the valve seat 65. The valve body 63 is subjected to a back pressing force produced by a spring 68. However, the back pressing force from the spring 68 is weaker than the valve closing force of the air acting on the valve body 63, and it is impossible for the force of the spring 68 alone to prevent the valve body 63 from opening the valve. For this reason, a rod 69 is attached to the valve body 63. The rod 69 extends through a hole 70 to enter the cylindrical hole 57 through its wall, the front end of said rod 69 contacting the walls surface of the actuating member 56. When the front end of the rod 69 is contacting the wall surface 62 other than that of the groove of the actuating member 56, the valve body 63 cannot move in the valve closing direction, so that the valve body 63 maintains the valve opening state even if the air pressure is acting on the valve body 63. In this case, however, in order to maintain the valve opening state, it is necessary for the actuating member 56 to be positioned at the left, as shown in FIG. 5, with the front end of the rod 69 contacting the wall surface 62 other than that of the groove of the actuating member 56. When the actuating member is pushed to the right by the rod 54, the front end of the rod 69 fits in the groove 61 of the acuating member 56, so that the valve body 63 is urged to close by the air pressure, When the rod 54 is moved leftward to its original position, the actuating member 56 tries to return leftward to its original position under the restoring force of the spring 60. If, however, the front end of the rod 69 fits in the groove 61, the actuating member 56 cannot move. Thereafter, when the supply of high pressure air to the automatic shut-off valve section 13 is cut off by the ON-OFF operating valve section 15, the high air pressure on the valve body 63 disappears, with the result that the valve body 63 is pushed in the valve opening direction by the force of the spring 68, with the front end of the rod 69 sinking and with the actuating member 56 returning to its original position at the left under the force of the spring 60. This state is shown in FIG. 5, with the front end of the rod 69 abutting against the wall surface 62 of the actuating member 56. Even if high pressure air is fed in thereafter, the valve is maintained in the closed state. The opening in the valve chamber 64 is closed by a threaded lid 71. A rod 72 formed on the lower region of the valve body 63 fits in a hole 73 in the threaded lid 71, preventing lateral movement of the valve body within the valve chamber 64.

The reversing valve section 14 will now be described. A valve body 74 is rotatably received in a bushing 75. The valve body 74 is manipulated with a knob 76. The bushing 75 is formed with four holes 77 located such that setting the valve body 74 at its solid line position shown in FIG. 7 establishes the communication between the holes 77a and 77b and between the holes 77c and 77d and setting it in its broken line position shown in FIG. 7 by means of the knob 73 establishes the communication between the holes 77a and 77d and between the holes 77b and 77c. The hole 77a is connected to an air passageway 78 leading to the ON-OFF operating valve section 15, the hole 77b is connected to the air passageway 66 leading to the automatic shut-off vale section 13, and the hole 77c is connected to an air passageway 79, which communicates with the air passage holes 27 in the air motor 20 as well as with an exhaust passageway 80. The latter extends along the outer side of the liner case 34 of the oil pressure pulse generating section 11 to reach exhaust holes 81 formed in the front wall of the cover 38. Thus, all the exhaust air from the air motor is discharged through said exhaust passageway 80. The hole 77d is connected to an air passageway 82 leading to the air passage holes 26 in the air motor 20. Since the holes in the bushing 75 are connected in the manner described above, if the valve body 74 is positioned as shown in solid lines in FIG. 7, the high pressure air from the ON-OFF operating valve section 15 passes through the hole 77a and then through the hole 77b, flowing through the air passageway 66 to the automatic shut-off valve section 13, where if the latter is open the air passes through the same and then through the air passageway 67 and is fed to the air passage holes 25. Thus, the high pressure air acts on the vanes 23 of the air motor 20 to rotate the rotor 21. Part of the air, after acting on the vanes 23, is discharged through the air passage holes 27, the remainder being discharged through the air passage holes 26. The exhaust passing through the air holes 27 is discharged through the exhaust holes 81 via the exhaust passageway 80. On the other hand, the exhaust passing through the air passage holes 26 passes through the air passageway 82 and then through the reversing valve section 14 and is likewise discharged through the exhaust holes 81 via the exhaust passageway 80. These exhausts serve to cool the oil pressure pulse generating section 11 when passing through the exhaust passageway 80. If the knob 76 is turned to move the valve body 74 to the broken line position shown in FIG. 7, the holes 77a and 77d communicate with each other, so that the high pressure air passes successively through the holes 77a and 77d, the air passageway 82 and the air holes 26 to enter the cylinder 24 of the air motor. In this case, therefore, the air passage holes 26 serve as air feed ports and the air passage holes 25 and 27 as exhaust ports, and the rotor 21 is rotated in the reverse direction.

The ON-OFF operating valve section 15 will now be described. A hose joint 85 attached to the end of a handle portion of the casing 19 provides a connection to an air feed hose from a compressor or the like, so that high pressure air is first fed to the valve section 15. A valve body 87 is housed in a valve chamber 86 and is adapted to contact and separate from a valve seat 89 at the end of a bushing 88. The bushing 88 is formed with air passage holes 90 communicating with the air passageway 78 leading to the reversing valve section 14. A rod 91 integral with the valve body 87 extends through the bushing 88, with the front end of the rod 91 contacting an operating lever 92. The operating lever 92 is pivotally supported on a pin 93, allowing the operator to manipulate the operating lever 92 with the fingers. Thus, when the operator pulls the operating lever 92 toward the handle portion 84, the rod 91 contacting the operating lever 92 is depressed, separating the valve body 87 from the valve seat 87 to open the valve, admitting high pressure air into the air passageway 78. When the operator releases the operating lever 92, the combined action of the air pressure and spring 94 moves the valve body 87 into contact with the valve seat 89, thus closing the valve. Thus, only when the operator manipulates the operating lever 92, high pressure air is fed into the air passageway 78, and when he releases it the air supply is automatically cut off.

As has been described so far, the fluid impulse torque tool according to the present invention is arranged so that manipulating the lever 92 opens the ON-OFF operating valve section 15, admitting high pressure air into the reversing valve section 14 via the air passageway 78, and if the reversing valve section 14 has been set by the knob 76 at the position for forward rotation shown in solid lines in FIG. 7, the high pressure air is fed to the automatic shut-off valve section 13. If the valve section 13 is in its opened state, the high pressure air is allowed to pass through the valve section 13 to the air motor section 10, where it rotates the rotor 20 in the forward direction and is then discharged. The rotation of the air motor 20 is transmitted directly to the oil pressure pulse generating section 11 to rotate the liner 31, and a torque produced by the pulse pressure is imparted to the main shaft 30 to perform the screw tightening operation. When a bolt or the like is tightened up, the rotation of the main shaft 30 is prevented, with the result that the oil pressure in the liner 31 increases. When the oil pressure reaches a predetermined value upon completion of screw tightening, the relief valve 40 is automatically opened to allow part of the oil on the high pressure side in the liner 31 to escape as relief oil. As a result, there is no possibility of the pressure in the liner 31 increasing above the fixed value. This relief oil flows into the oil chamber 50 of the piston section 12, pushing the piston 51. With this movement of the piston, the rod 54 is pushed and hence the actuating member 56 is pushed. As the actuating member 56 is moved, the position of the groove 61 coincides with the position of the front end of the rod 69, allowing the front end of the rod 69 to fit in the groove 61, so that the valve body 63 contacts the valve seat 65, closing the automatic shut-off valve section 13 and stopping the rotation of the air motor section 10. Thus, the oil pressure generating section 11 ceases to produce oil pressure pulses. Thereafter, when the operator releases the operating lever 92, the ON-OFF operating valve section 15 is closed, with the result that the back pressure becomes zero, allowing the automatic shut-off valve section 13 to return to the valve opening state to be ready for the next operation. At this time, since the oil pressure pulse generating section 11 has already stopped, there is no relief oil flowing into the oil chamber 50. Therefore, the piston 51 has already returned to its original position, and the rod 54 and actuating member 56 return to their original positions to be ready for the next operation.

What is claimed is:

1. In a fluid driven torque tool having motor means for generating torque pulses, fluid passageways for conducting a driving fluid to said motor means, moveable pressure relief means coupled with said motor means for maintaining pressure in said motor means below a predetermined amount, an elongated member coupled to, and moveable with, said pressure relief means, for controlling fluid flow through said passageways, and means for automatically blocking flow of said fluid to said motor means when said pressure exceeds said predetermined amount, the improvement comprising:

said blocking means comprising a valve having a moveable portion continuously engaging a portion of said elongated member, said elongated member and said valve moveable portion being moveable in directions normal to each other.

2. The improvement of claim 1 wherein said elongated member portion includes first and second distinct camming surfaces, said valve moveable portion being engaged with said first camming surface when said pressure in said motor is maintained below said predetermined amount, and said valve moveable portion being engaged with said second camming surface when said pressure in said motor means exceeds said predetermined amount.

3. The improvement of claim 2 wherein said first camming surface causes said valve moveable portion to open said valve, and said second camming surface causes said valve moveable portion to close said valve thereby blocking flow of said fluid to said motor means.

4. The improvement of claim 3 wherein said first camming surface constitutes the transverse dimension of said elongated member and said second camming surface comprises a groove in said first camming surface.

5. A fluid impulse torque tool, comprising:
means for admitting high pressure fluid to said tool,
an air motor rotatably driven by said fluid,
a passageway, connecting said admitting means with said air motor, for conducting said fluid from said admitting means to said air motor,
an on-off valve means, disposed in said passageway, for selectively blocking flow of said fluid from said admitting means through said passageway,
an automatic shut-off valve disposed in said passageway between said on-off valve means and said air motor,
an oil pressure pulse generating motor driven by said air motor for generating a pulse torque as said air motor is rotated,
a relief valve in said oil pressure pulse generating motor defining means for releasing oil from said oil pressure motor when the pressure in said oil pressure motor exceeds a predetermined amount,
oil chamber means for receiving said released oil,
a piston received in said oil chamber and movable therein, the movement of said piston being dependent on the amount of oil received by said oil chamber,
and a movable actuating member connected at one end to said piston, said piston and said actuating member moving in unison in a first direction, said actuating member including at its opposite end first and second distinct surface means for moving said automatic shut-off valve to respective open and closed positions,
said automatic shut-off valve including a first portion disposed entirely within said passageway and defining means for blocking flow of said fluid through said passageway, and a second portion engageable with said first and second surface means, said second portion defining means for displacing said first portion in a second direction to or from said blocking position in said passageway,
whereby when the pressure in said oil pressure motor is below said predetermined amount, said actuating member first surface means engages said automatic shut-off valve second portion and maintains said valve in an open position, and when said oil pressure exceeds said predetermined amount, said actuating member second surface means engages said automatic shut-off valve second portion and moves said first portion to said blocking position.

6. The fluid impulse torque tool of claim 5 wherein said actuating member comprises an elongated rod, said second surface means comprises a circumferential groove in said rod, said shut-off valve first portion including biasing means for continuously maintaining said shut-off valve second portion in contact with said rod opposite end.

7. The fluid impulse torque tool of claim 5 wherein said actuating member defines a first axis and said shut-off valve second portion defines a second axis, said first and second axes being substantially normal to one another.

* * * * *